United States Patent [19]

Driller et al.

[11] Patent Number: 4,745,296
[45] Date of Patent: May 17, 1988

[54] PROCESS FOR OPTICALLY TESTING CIRCUIT BOARDS TO DETECT INCORRECT CIRCUIT PATTERNS

[75] Inventors: Hubert Driller; Paul Mang, both of Schmitten, Fed. Rep. of Germany

[73] Assignee: Mania Elektronik Automatisation Entwicklung und Gerätebau GmbH, Schmitten, Fed. Rep. of Germany

[21] Appl. No.: 930,362

[22] Filed: Nov. 12, 1986

[30] Foreign Application Priority Data

Nov. 12, 1985 [DE] Fed. Rep. of Germany ....... 3540100

[51] Int. Cl.$^4$ .................... G01N 21/88; G06K 9/00
[52] U.S. Cl. ................................. 250/563; 356/394; 382/8
[58] Field of Search ............... 250/563, 572; 356/237, 356/430, 431, 394; 358/108, 101, 107; 382/8

[56] References Cited

U.S. PATENT DOCUMENTS 4,559,603  12/1985  Yoshikawa ..................... 356/237
4,635,289   1/1987  Doyle et al. ..................... 356/431

Primary Examiner—David C. Nelms
Assistant Examiner—Stephone B. Allen
Attorney, Agent, or Firm—Wenderoth, Lind & Ponack

[57] ABSTRACT

A circuit board having conductor tracks is optically tested for functional faults by use of a computer controlled testing apparatus including at least one camera. The surface of the circuit board is scanned in a point-by-point manner by the camera to establish for each point scanned an image respresentative indicative of a conductor track area or a non-conductor track area. The surface of the circuit board is divided into a predetermined plurality of windows of predetermined size, and the image representations are associated with respective windows. For each window a determination is made of the sum of only the points of the window corresponding to a conductor track area or the sum of only the points of the window corresponding to a non-conductor track area. This establishes an identification value descriptive of the particular window. The identification values of the windows of the circuit board being tested are compared with predetermined values of corresponding respective windows of a reference master.

6 Claims, 1 Drawing Sheet

PROCESS FOR OPTICALLY TESTING CIRCUIT BOARDS TO DETECT INCORRECT CIRCUIT PATTERNS

BACKGROUND OF THE INVENTION

The present invention relates to a process for optically testing a circuit board or the like having conductor tracks for detecting functional faults such as shorts, conductor track interruptions and conductor track misplacement. More particularly, the present invention is directed to such a process wherein such optical testing is achieved by a computer controlled testing apparatus including at least one camera which scans the surface of the circuit board in a point-by-point manner and establishes for each point scanned an image representation indicative of a conductor track area or a non-conductor track area. These representations then are utilized to ascertain whether widths of the conductor tracks and spacings therebetween have required minimum values.

A known process of this type involves a so-called "design rule test" for testing circuit boards on a microscopic scale to determine the dimensions of and the distances between the conductor tracks. In this known process, minimum acceptable values of conductor track widths and spacings to be detected initially are entered by a user into the testing apparatus which then executes the test. More particularly, the machine scans circuit boards fed to it to check the above dimensions. Such machine however does not perform any comparison with a master or reference circuit board or with any previously stored values. The test merely senses configurations of the circuit board on a local or board-by-board basis to determine whether predetermined minimum values are observed. In this design rule test, conductor track position is irrelevant.

As is known, testing is executed by a scanning procedure in which each image is divided into a plurality of image points. Video information provided in lines or arrays by a video camera is converted to analog signals and is processed to remove undesirable side effects, thereby resulting in a rastered image of the circuit board which has only black and white areas corresponding to metal or non-metal areas. The black and white information so obtained is used for comparison with predetermined minimum width values. In this manner, it may be determined whether the minimum requirements of the circuit board under test are satisfied.

One disadvantage of this design rule process is that it cannot detect, for instance, the presence of incorrectly printed circuit boards since the test is conducted regardless of the pattern of the conductor track on an individual circuit board. Thus, regardless of the particular manner in which the conductor tracks are laid out, testing is concerned only with whether the test object corresponds to predetermined design rules, i.e. minimum spacings, minimum widths. At most, the circuit board under test may be inspected for the presence of geometric shapes which are not permissible, such as conductor tracks extending at acute angles.

Another disadvantage of this known process is that it fails in situations in which deficient circuit processing during manufacture results in a pattern which is faulty, yet which satisfies the predetermined design rule, i.e. minimum spacing, minimum width. For example, this known process may accept undesirable conductor track interruptions as long as the dimensions of such interruptions correspond to predetermined and permissible conductor track spacing values. Because of component loss during component placement and of faulty function of assembled circuit boards, failure to recognize faults of this type may result in substantial expense once a circuit board of this type is placed into use.

To exclude the possibility of the occurrence of such faults, a bit-by-bit comparison may be conducted, employing reference circuit boards. Even if comparison is made using a coarser grid or raster, such as a 4:1 reduction, the amount of data to be processed would be immense. Accordingly, a bit-by-bit comparison with a reference circuit board is hardly practicable.

SUMMARY OF THE INVENTION

Accordingly, it is the object of the present invention to provide a process of optically testing circuit boards, which process can operate in the microscopic domain or on a microscopic scale, and which can execute the known design rule test, but additionally which is intelligent enough or has the capability of testing for the presence of a specific type of circuit board.

This object is achieved in accordance with the present invention by dividing the surface of the circuit board under test into a predetermined plurality of windows of predetermined size, and associating the image representations with the respective windows. For each window, the sum of only the points of the window corresponding to a conductor track area or the sum of only the points of the window corresponding to a non-conductor track area are determined, thereby establishing an identification value descriptive of that particular window. The identification values of all of the windows then are compared with predetermined values of corresponding respective windows of a reference master such as a reference circuit board or a reference film.

In addition to the known test on a microscopic scale to determine the dimensions of and spacings between conductor tracks, the process of the present invention is employable on a macroscopic scale, thereby resulting in the substantial advantage that the process of the invention can recognize whether or not it is a specific circuit board which is being tested at any given time. Advantageously, the amount of information to be processed or evaluated is less than necessary for a bit-by-bit comparison with a reference circuit board. Consequently, the process of the present invention may be executed with electronic circuits and means of comparatively simple structure.

In accordance with a more specific feature of the present invention, the image representations are established, for each window, by assigning black and white values to the scanned points indicative of conductor tracks areas and non-conductor track areas, respectively. Then, for each window, the black and white values are summed to arrive at a relative gray value equal to the identification value. This may be determined on a macroscopic scale. Additionally, with respect to the information to be processed and with regard to sensitivity, it is possible to determine, for each window, coordinates of the center of gravity or center of concentration of the conductor track areas or of the non-conductor areas, for example of the gray value, by summing coordinates of the image representations indicative of the conductor track areas and of the non-conductor areas, i.e. of the black and white values. This can establish an additional identification value descriptive of each window, and these additional identification values of the windows can be compared with predetermined coordinate values of centers of gravity or centers of concentration of corresponding respective windows of the reference master. Yet further, in accordance with the present invention it is possible, for each window of the reference master, to additionally determine a value representative of permissible variation in width of the conductor tracks due to manufacturing tolerances. This is done by detecting which of the image representations of the reference master are representative of points along a boundary line between a conductor track area and a non-conductor area by comparing, for each point, the image representation of such point with image representations of plural neighboring points in predetermined directions. These predetermined directions preferably may be in the four directions of a rectangular coordinate system (X, Y coordinates). When the boundary line points are determined, they are summed to result in a permissible width variation value, and this value then is compared with corresponding values of the respective windows of the circuit board being tested. It thereby is possible to detect departures from nominal conductor widths, for example as may result from circuit board manufacturing techniques, as being tolerable or not.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
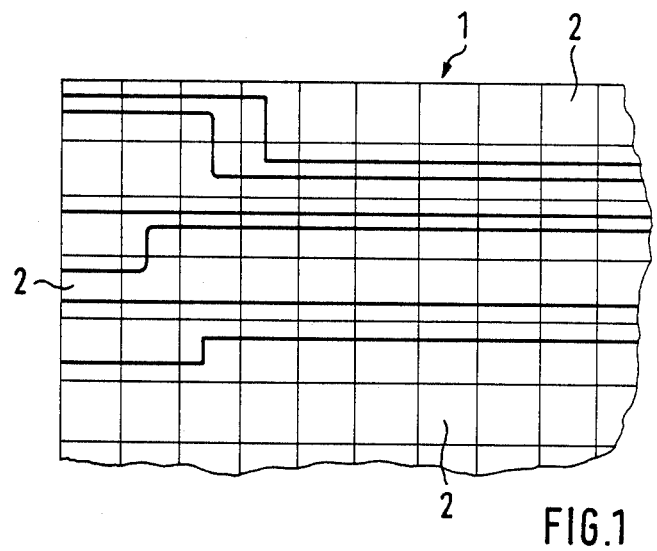
FIG. 1 is a plan view of a portion of a circuit board to be tested.

FIG. 1 illustrates a portion of a circuit board to be tested in the macroscopic domain or on the macroscopic scale, and specifically illustrates a circuit board 1 having thereon conductor tracks arranged in a particular pattern. In accordance with the present invention, the circuit board is divided into a predetermined plurality of areas or "windows" 2 of predetermined size, for example in a grid-like manner. The surface of the circuit board is scanned in a known manner by at least one camera of a known computer controlled testing apparatus to thereby establish for each point scanned an image representation indicative of a conductor track area or a non-conductor track area. In accordance with the present invention, these image representations are associated with the respective windows. Then, for each window 2 the sum of only the points of the window corresponding to a conductor track area or the sum of only the points of the window corresponding to a non-conductor track area are determined, i.e. counted. This establishes an identification value descriptive of the particular window, and then these identification values descriptive of the windows of the circuit board being tested are compared with predetermined values of corresponding respective windows of a reference master, such as a reference circuit board or a reference film.

In a more specific implementation of the present invention, for example where the conductor tracks are of copper, the testing apparatus scanning each window determines for each point (determined by the particular camera employed) image representations indicative of "copper" or "no copper". That is, the testing apparatus may assign black and white values to the scanned points indicative of conductor track areas and non-conductor areas, respectively. Summation of these black and white values for each window will result in a gray value equal to an identification value which is indicative and representative of that particular window. This value itself is compared with the value of the corresponding window of the reference master. As a result, only one value need be stored in the memory of the testing apparatus.

Additionally however, it is possible to determine for each window another image representation indicative of that particular window. This value may be the coordinates of the "center of gravity" or the center of concentration of the conductor track areas or of the non-conductor areas. For example, the testing apparatus may determine the coordinates of each point indicated by an image representation of a conductor track area, for example a black point, or may determine the coordinates of each point indicated by an image representation indicative of a non-conductor track area, i.e. white points. The coordinates of all of these points may be summed, thereby resulting in coordinates representative of the center of gravity or center of concentration. This coordinate value for each window is an additional identification value of that particular window, and this may be compared with predetermined coordinate values of a center of gravity of a corresponding respective window of the reference master.

This comparison of one or both of the identifying features or identification values of the windows of the circuit board being tested with corresponding respective windows of the reference master easily can determine whether the particular circuit board being tested has a defect. Thus, there is achieved a window-by-window comparison, with each gray value distribution (and optionally the distribution of the center of gravity) of a window 2 of the circuit board 1 under test being compared with like values of a corresponding window on the reference master. Any deviation in these values is indicative of a fault which may be evaluated for severity.

For each window of the reference master, only one gray value, and possibly the coordinates of the center of gravity of the conductor track areas or non-conductor track areas, need be memorized by the test apparatus for subsequent comparison with the similar values of a corresponding window 2 on a circuit board 1 under test. As a result, there is a dramatic reduction in the amount of data to be memorized and processed, thereby resulting in substantial advantages of the process of the present invention.

It is to be noted that the conductor tracks on the circuit boards may be of materials other than copper, in a manner known per se, and it is intended that the process of the present invention operate to evaluate only the contrast between conductor track areas and non-conductor track areas.

The size of windows 2 is established in accordance with desired accuracy. In general, the accuracy required for gray value analysis and, possibly, the determination of the coordinates of the center of gravity or concentration increases with the size of windows 2. Thus, if the windows are excessively large, errors inherent in determining of test values may assume an order of magnitude corresponding to the faults to be detected (such as a conductor track being missing) so that useful test results no longer can be obtained. As a consequence, windows of too great a size produce excessive measurement error. One skilled in the art would understand possible and acceptable window sizes for a given test procedure. For the above reasons, macroscopic analysis of test results compared with the known design rule test may yield a data reduction in a ratio of 1:64. This value is intended to be exemplary only however. The essential requirement for the amount of reduction to be used in each individual case is that the surface area, i.e. the number of test points in the window, should be a few hundred times greater than the size of the bit unit or point determined by the particular camera employed in the test apparatus. In use, the size of the windows is selected so that in evaluation the characteristic appearance of each window, i.e. the proportion and location of the conductor track areas therein, or the black or white areas and their centers of gravity or concentration, may be ascertained with an acceptable level of certainty and safety.

Evaluation is executed by the data collected during a design rule test being coupled in parallel to counter means for a window-wise determination of the gray values, and optionally of the coordinates of the centers of gravity or concentration. Such counter means operate to establish the gray value of a given window by counting the number of points of such window corresponding to conductor track areas and the number of points corresponding to non-conductor track areas. The coordinates of the center of gravity or concentration of the conductor track areas are determined from a summation of the coordinates of the points corresponding to the conductor track areas or the non-conductor track areas, respectively, in a coordinate system, i.e. in the X and Y directions of each window. For each scanned window, a gray value and, if employed, the coordinates of the center of gravity or concentration are determined in this manner. These values and coordinates then are compared with corresponding values and coordinates of corresponding windows of the reference master.

The circuit boards to be tested are aligned with the aid of reference points memorized at the time the test apparatus is initialized. For example, four or eight reference points may be selected. Upon the introduction of a circuit board to be tested, the apparatus determines the positions of the reference points to ascertain the actual position of the circuit board, taking into account dimensional tolerances. This position determining step is executed in preparation of the design rule test and of the macroscopic test. On the basis of the circuit board position thus determined, the testing apparatus proceeds to inspect or scan the windows, each of which may have, for example, a size of 0.8×0.8 millimeters or 32×32 pixels, with one pixel being one bit unit or point provided or determined by the particular camera employed in the testing apparatus. For example, the individual windows may be provided or determined by the camera scanning the circuit board along a meander-shaped path. Each deviation or change representative of a defect of one of the windows 2 of a circuit board 1 results in a drastic change in the color density or the gray value and in the position of the center of gravity of the conductor track area or non-conductor track area. Such change in macroscopic values easily is detected. For example, when a conductor track is missing in a particular window, then the gray value of that particular window will change substantially, thereby indicating such defect. The same holds true where a conductor track is displaced substantially from a desired position within the window, since such displacement will result for instance in a substantial change in the location of the coordinates of the center of gravity of the conductor track area or the non-conductor track area. Accordingly, macroscopic testing permits departures from the desired gray values or coordinates to be detected with a high probability of success, without the necessity of determining the precise positions of the specific image values.

When a film is employed as the reference master, rather than a reference circuit board, then differences between the film and the circuit board which may occur during manufacture may be evaluated in a simple manner. Depending on the particular etching process employed, the width of the conductor tracks on a circuit board under test will be slightly greater than on the film. These differences readily may be accommodated by respective percentage values in accordance with the process of the present invention, since copper values are known to change by specific or predetermined amounts. As a result, simple comparison of numerical data will be sufficient, and full image processing will not be necessary.

During circuit board manufacture, treatment procedures frequently result in conductor tracks which are wider or narrower than desired. This may result in different changes of density in a given window, although the copper percentage is the same. In order to detect such changes, or to determine whether such changes are or are not within acceptable limits, a particularly advantageous further development of the present invention permits the reference or master circuit board to be analyzed with regard to the lengths of the boundaries between the conductor tracks and the non-conductor track areas in any window. This is accomplished by counting the number of points in the boundary regions and by memorizing the resultant count. More particularly, the points in the boundary regions are those conductor track points which are contiguous to a non-conductor track area, or those points of a non-conductor track area which are contiguous to a conductor track area.

Figure 2:
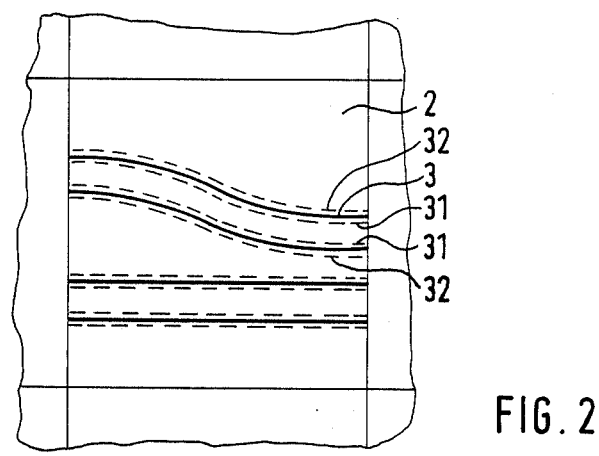
FIG. 2 is an enlarged view of a portion thereof, illustrating a development of the present invention.

The specific procedure used in practical operations may be as follows. First of all, it must be determined which points are boundary or boarder line points. To make this determination, the testing apparatus detects which of the image representations are representative of points along a boundary line between a conductor track area and a non-conductor track area by comparing, for each such point, the image representation of such point with image representations of plural neighboring points in predetermined directions. For example, for each point in a window, a determination is made whether or not a neighboring point in any one of different directions has a different image representation. In other words, if each point has an image representation of copper, for example, and a neighboring point has an image representation of no copper, for example, the conclusion is made that each such point is a boundary line or boarder line point. The predetermined directions can be chosen arbitrarily. However, in a preferred arrangement the directions are the four directions of a rectangular coordinate system (X, Y coordinates). The boarder or boundary line points then are summed, for example by coordinates. During such summing process, each boundary line point automatically will be entered twice into the result. Consequently, instead of a sharp boarder line, the result will be a boarder line area shown in FIG. 2 by the dashed lines and which may be termed a "tube region". In the window-wise scanning of the circuit boards to be tested, the points located inside the tube regions are disregarded, i.e. they are not entered into the summing operation. Consequently, all of the conductor tracks of a circuit board under test which are somewhat narrower (dashed lines 31) or somewhat wider (dashed lines 32) than a conductor track 3 of the reference master are considered to be acceptable. As a result, widening or narrowing of conductor tracks within the limits of the particularly determined dashed lines during the manufacturing process will not be considered a fault. These values of each window of a circuit board being tested are compared with permissible width variation values of the respective windows of the reference master.

In actual operation, the non-analytic counting process employed in the present invention accepts broadened and narrowed conductor tracks which do not correspond to broadening or narrowing by one pixel. This is because, in dependence of the geometric extending of the conductor tracks or the boundary lines (angular position, etc.) a smaller number of pixels also may be detected, such as a number of pixels reduced by a factor of 0.3. As a consequence, the tube region thus detected will be narrower than the tube region defined by two pixels, so that the process in its entirety will be finer.

In order to reduce substantially the window information to be memorized, i.e. in the case the amount of data is to be kept within predetermined limits, it is possible on the macroscopic scale to determine for each window either the gray value only or both the gray value and the center of gravity coordinates. Alternatively, it is contemplated to determine only the gray value and the value representative of permissible variation in width of the conductor tracks due to manufacturing tolerances. In the later case, the amount of data to be collected may be reduced by about two-thirds, with the fault detection process still operating in a highly accurate manner. It is possible in this case to normalize parameter changes caused during manufacture to the calculated value representative of permissible variation in width of the conductor tracks due to manufacturing tolerances.

Although the present invention has been described and illustrated with respect to preferred features, it is to be understood that various modifications and changes may be made to the described and illustrated procedures without departing from the scope of the present invention. Furthermore, it specifically is to be understood that the process of the present invention is employable with otherwise generally known and conventional computer controlled testing apparatus including at least one scanning camera, but modified in a manner readily understood by one of ordinary skill in the art to conduct the process of the present invention.

We claim:

1. In a process for optically testing a circuit board or the like having conductor tracks for functional faults, such as shorts, conductor track interruptions and conductor track misplacement, by means of a computer controlled testing apparatus including at least one camera, said process comprising scanning the surface of said circuit board in a point-by-point manner by means of said camera and thereby establishing for each point scanned an image representation indicative of a conductor track area or a non-conductor track area, and utilizing said representations to ascertain whether widths of said conductor tracks and spacings therebetween have required minimum values, the improvement comprising:

dividing said surface of said circuit board into a predetermined plurality of windows of predetermined size;

associating said image representations with respective said windows;

counting for each said window only said points of said window corresponding to a conductor track area or said points of said window corresponding to a non-conductor track area, whereby the sum of such counting establishes an identification value descriptive of said window; and comparing said identification values of said windows with predetermined values of corresponding respective windows of a reference master.

2. The improvement claimed in claim 1, comprising for each said window, assigning black and white values to said scanned points indicative of conductor track areas and non-conductor track areas, respectively, and said counting comprises, for each said window, summing said black and white values to arrive at a relative gray value equal to said identification value.

3. The improvement claimed in claim 1, further comprising, for each said window, additionally determining coordinates of the center of gravity of said conductor track areas or of said non-conductor track areas by summing coordinates of said image representations indicative thereof, and thereby establishing an additional identification value descriptive of said window, and comparing said additional identification values of said windows with predetermined coordinate values of centers of gravity of corresponding respective windows of said reference master.

4. The improvement claimed in claim 1, wherein said reference master is a reference circuit board.

5. The improvement claimed in claim 1, wherein said reference master is a film.

6. The improvement claimed in claim 1, further comprising, for each window of said reference master, additionally determining a value representative of permissible variation in width of said conductor tracks due to manufacturing tolerances, said additionally determining comprising detecting which of said image representations are representative of points along a boundary line between a conductor track area and a non-conductor track area by comparing, for each said point, the image representation of said point with image representations of plural neighboring points in predetermined directions, and summing said boundary line points to result in said permissible width variation value, and comparing said permissible width variation value with corresponding values of respective windows of the circuit board being tested.

* * * * *